March 21, 1939.  H. E. PEREZ  2,151,151
AUTOMATIC GEAR TRANSMISSION
Filed June 5, 1937
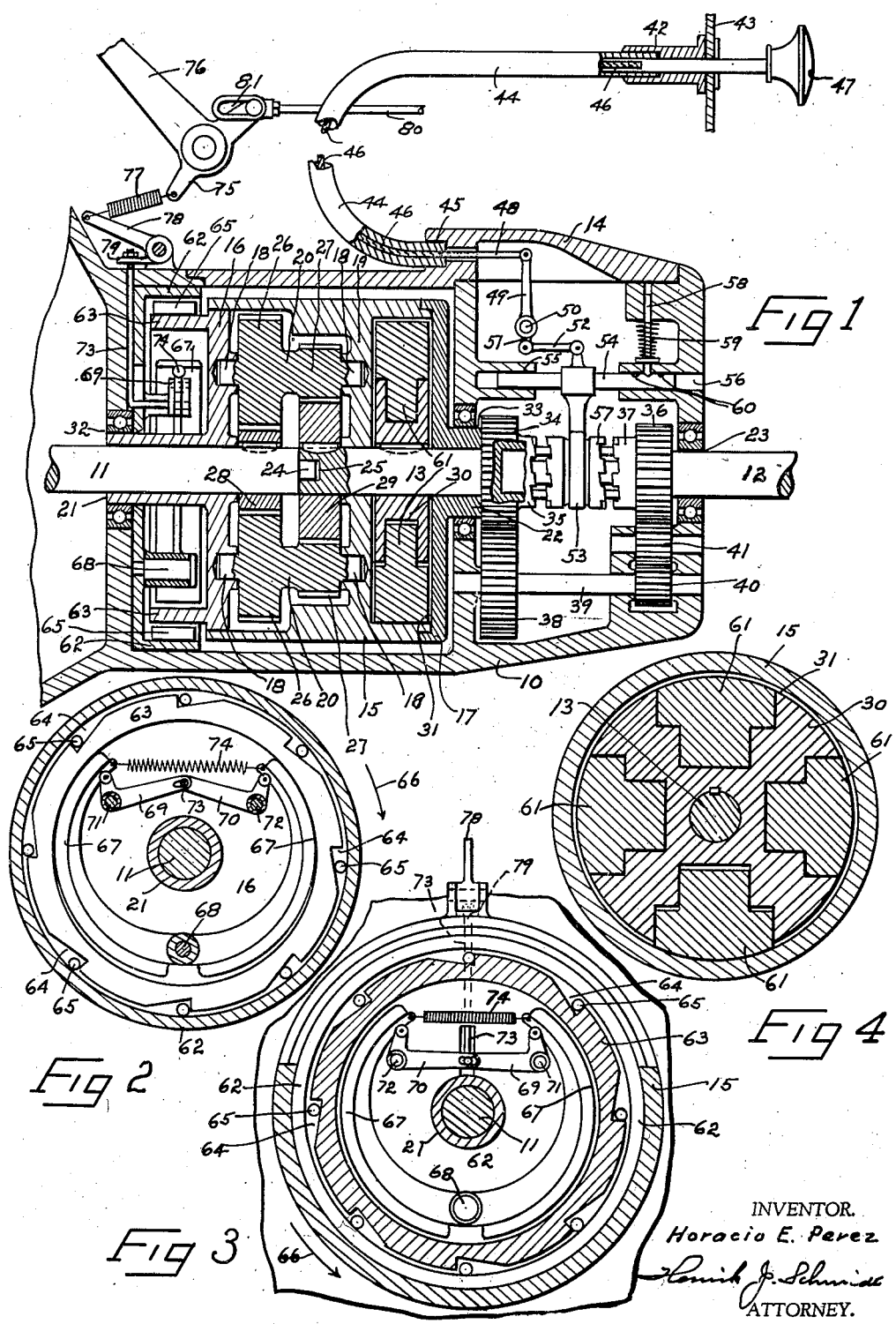
INVENTOR.
Horacio E. Perez
ATTORNEY.

Patented Mar. 21, 1939

2,151,151

UNITED STATES PATENT OFFICE 2,151,151

AUTOMATIC GEAR TRANSMISSION

Horacio E. Perez, Valhalla, N. Y.

Application June 5, 1937, Serial No. 146,528

3 Claims. (Cl. 74—260)

The invention relates to gear shift transmissions particularly such as are used on automotive vehicles, but may be put to other uses. It has for one of its principal objects to provide a gear transmission which is entirely automatic in its operation and through the instrumentality of which the different speeds, or gear ratios, are automatically obtained in a continued sequence, as the speed of the vehicle on which it is used is increased, so that the engine may be automatically kept at its optimum R. P. M. and thus develop its maximum torque at all times. This prevents stalling and results in greater fuel economy.

Another object is to provide a mechanism in which the actual gear shifting is eliminated, in which the gears employed are always in mesh with their co-acting members, and in which the gear ratio is always the most adequate at any given load or speed. A further object is to provide a gear transmission which is noiseless in its operation, which relieves the strain on the parts with which it is connected, which has no parts easily broken or apt to get out of order, which may be operated with but slight skill on the part of the driver, which is suitable for all makes of automotive vehicles, which requires no changes or additions to the other standard parts of the motor vehicle, and which can be manufactured at a relatively low cost.

A still further object is to provide an automatic mechanical transmission which is self-regulating, as to the speed and proper gear ratio, depending on the momentum of the moving vehicle; and which will absorb any sudden strain or uneven change of load on the engine, without any attention from the driver.

These and various other objects and advantages will be readily understood from the following description and from the accompanying drawing of a preferred embodiment of the invention, in which, however, modifications may be made without departing from the scope of the appended claims. In the drawing, Fig. 1 is a cross-sectional side elevation of the gear casing and its mechanism, with parts broken away to facilitate the description;

Fig. 2 is a cross-sectional end view of the "casing control device" as seen from the engine end of the device;

Fig. 3 is another cross-sectional end view of the "casing control device", but as seen from the opposite end; and Fig. 4 is a cross-sectional end view showing the "centrifugal friction member".

Referring now to all the views simultaneously, the gear casing is shown at 10, the engine shaft at 11, the drive shaft at 12, a stub-shaft at 13, and a cover, which gives access to the gear casing at 14. A rotary drum 15 is provided with a front member 16 and a rear member 17. These parts are secured to the drum by any suitable means. The drum is cylindrical and in it is contained the automatic gears as well as a centrifugal friction device all of which will be described later. Bearings 18 are formed in the end member 16 and in an intermediate member 19 of the drum and in these bearings idlers 20 are free to rotate. Bearings 21 and 22 are formed respectively in the front and rear members of the drum and in these bearings the shafts 11 and 13 rotate, while the shaft 12 rotates in a bearing 23 formed directly in the gear casing. The drum is oil-tight and completely filled with lubricating oil.

The engine shaft 11 is provided with a reduced portion 24 which rotates in a bearing 25 formed in the end of shaft 13. Each of the idlers 20, of which three or more may be used, are made in one piece and each consists of a large gear 26 and a smaller gear 27. All the idlers are arranged and operated as planetary gears around gears 28 and 29 keyed respectively to shafts 11 and 13. A rotating member 30 is also keyed to the shaft 13 and contained within a chamber 31 formed in the drum. This rotor will be described later.

The bearings 21 and 22 in which the shafts 11 and 13 rotate is in turn rotatably mounted in bearings 32 and 33 formed in the gear casing. These bearings as well as the bearing 23 are provided with bearings of the anti-friction type. The shaft 13 is preferably formed in one piece with a gear 34 and on the front end of this gear a clutch member 35 is formed. Another gear 36, likewise provided with a clutch member 37, is rotatingly mounted on the driving shaft 12. The gear 34 meshes with a gear 38 rigidly mounted on a counter-shaft 39. On the other end of this counter-shaft a smaller gear 40 is rigidly mounted which, through an idler 41, meshes with the gear 36.

A bushing 42 is mounted on the dashboard 43 and a tubing 44 is connected between this bushing and an opening 45 in the gear casing cover 14. A flexible metal cable 46 is slidingly mounted in the tubing and one end of this cable is connected to an operating knob 47, while the other end is connected to a rod 48, which is pivoted to a lever 49 rotatingly mounted on a shaft 50 in the gear casing. A shorter lever 51 is cast integrally with the lever 49 and is pivoted to a link 52, which in turn operates a yoke 53 rigidly mounted on a shaft 54 which slides in bearings 55 and 56, formed in the gear casing. The yoke drives the sliding clutch-member 57 which is adapted to engage with the clutch members 35 and 37 formed, respectively, on the gears 34 and 36.

To lock the yoke in the desired position, a plunger 58 is employed. This plunger is actuated by a spring 59 which engages in notches 60 cut in the shaft 54. The clutch member 57 rotates with the shaft 12. It will readily be seen that by manipulating the knob 47 the gears may be placed in "neutral", as shown in Fig. 1, or in "forward" or in "reverse" as desired. When the clutch part 57 is engaged with the clutch part 35 it will impart forward motion to the car, and when engaged in clutch part 37 it will impart reverse motion.

The rotating member 30 is shown in detail in Figs. 1 and 4. As previously stated it is keyed to the shaft 13 so as to rotate with this shaft and is contained within the chamber 31, formed in the drum 15. Four centrifugal weights 61 are mounted in recesses formed in the rotor and are free to slide in these recesses. The shapes of the recesses and the weights are plainly shown in Figs. 1 and 4. As the shaft 13 and member 30 rotate together, the centrifugal force will cause the weight 61 to be forced against the walls of the drum and, as the friction increases with the speed of rotation, they will finally cause the drum to rotate at the same speed as the shaft. By virtue of this friction, the inherent tendency of the drum to rotate, because of its fly-wheel action and because of the friction with shafts 11 and 13 is augmented and made positive as the speed of the vehicle increases.

Figs. 2 and 4 show the drum control-device in detail, but reference is also made to Fig. 1. Another drum 62 is rigidly secured to the gear casing so that it cannot rotate. The front member 16, of the drum 15, is provided with a forwardly-extending, annular ring 63 and on the outside of this annular ring, a plurality of angular notches 64 are formed. In these notches rollers 65 are inserted, as plainly shown in the views. These rollers allow the drum to turn freely in the same direction as the engine shaft, as indicated by the arrows 66, as shown in Figs. 2 and 3, but will lock the drum 15 to the drum 62 if the drum 15 begins to turn in the opposite direction.

A mechanically operated brake is contained within the drum 62 and the annular ring 63. It consists of two brake shoes 67 which are hinged on a stud 68 secured on the drum, as plainly shown in Fig. 1. The brake shoes engage against the inner walls of the annular ring 63. The upper ends of the brake shoes are connected to a pair of bell-cranks 69 and 70 which are pivoted on studs 71 and 72, likewise secured on the drum 62. The bell-cranks 69 and 70 are actuated by a rod 73, while the brake shoes are normally held in their inactive positions by a tension spring 74 which is attached to the extreme ends of the shoes.

As previously said the drum is allowed to rotate freely in the same direction as the shaft 11, but is locked by the rollers if the motion is reverse. The rotation of the drum may also be slowed down or stopped by means of the brake shoes. An arm 75 is made integral with the foot brake pedal lever 76 and a spring 77 is connected between the arm 75 and a lever 78 which is formed integrally with another arm 79 to which the upper end of the rod 73 is connected. Thus when the foot brake 76 is depressed the arm 75, through the spring 77, actuates the lever 78 and consequently, through the arm 79 and rod 73, actuates the bell-cranks 69 and 70, thus forcing the brake shoes 67 against the annular ring 63 and slowing down, or stopping, the rotation of the drum.

The tension of the spring 77 is sufficient to completely stop the drum before the spring is perceptibly stretched. The rod 80, usually connected to the wheel brakes, is slotted at its front end, as shown at 81, so that the brake pedal 76 may partly be operated before the wheel brakes are actuated. Thus the rotation of the drum may be slowed down or stopped without actually setting the wheel brakes. The advantages of this arrangement will be made clear as the operation of the entire mechanism is explained.

The transmission operates in the following manner: In Fig. 1 the transmission is shown in neutral position and is assumed to have been disconnected from the running motor by the conventional type of main clutch. By pushing the knob 47 in, the lever 49 is actuated and causes the clutch member 57 to engage with the clutch member 35, thus shifting the gears into "forward speed". This constitutes all the "shifting" necessary on the part of the driver.

As the main clutch is released, the engine shaft 11 begins to turn and with it gear 28. Since this gear is in mesh with all the idlers 20 and these idlers, in turn are in mesh with the gear 29, the turning of the shaft 11 must result in one of two motions; either gear 29 together with the shaft 13, gear 34, clutch part 35, clutch part 57 and shaft 12 will rotate in the same direction as engine shaft 11 (at a lower speed of course depending upon the gear ratio used in the idlers), or the idlers 20 will rotate and simultaneously move in the opposite direction. In the latter case the entire revolving drum 15 must necessarily turn with the idlers 20, but will be checked in its reverse motion by the rollers 65 as previously explained and illustrated in Figs. 2 and 3. Therefore, the engine power must be transmitted as follows: From engine shaft 11 and gear 28, to the gears 26 of the idlers, from the smaller gears 27 of the idlers, to the gear 29 and hence, through the stub shaft 13 and through the clutch, to the driving shaft 12. Obviously, due to the gear ratio used, the rotation of shaft 12 is decreased in speed but increased in power. The motor is now in "low".

As the speed of the engine is accelerated and the increasing momentum of the car diminishes the load, the revolving drum will tend to rotate because of its stored energy. This tendency is augmented by the friction at the bearings of the idlers as their rotation will slow down in direct proportion to the turning of the drum. Besides, friction of engine shaft 11 and of the drum at its long bearings 21 and 22, as well as the friction of the shaft 13, will tend to turn the drum with them. As shaft 13 turns, the rotary member 30 will also turn and the centrifugal force thus developed will force the sliding weights 61 against the revolving casing so that it will finaly turn at the same speed as the shaft 13, which is connected by the clutch mechanism to shaft 12. When this occurs, the idlers must have stopped their rotation and therefore the entire system is turned as a single unit. The gear is now in "direct drive".

It is obvious that in making this change from

"low" and into "direct drive", the mechanism must have passed through all ratios of power and speed. Therefore, if the gear ratios are properly chosen, the mechanism will, as the speed of the vehicle increases, automatically change from "low" into "direct drive" through a countless series of gear ratios, gradually passing from one into the other in a continued sequence, without breaks or jerks and as speedily as the momentum of the vehicle will permit. At first it may seem impossible to obtain different gear ratios with the same set of gears but this is made possible by the rotation of the drum 15 together with the simultaneous slowing down of the idlers 20.

Any sudden increase in the load will cause the drum to slow down and so, the shock is automatically absorbed in the transmission and not passed on to the motor. This prevents stalling because the ratio immediately and automatically becomes adequate to any given change in power, load or speed, whether this change is gradual or sudden. Thus this automatic gear transmission, although under positive control at all times, has enough inherent flexibility to absorb and to adjust itself to all sudden jerks and strains.

Whenever it becomes necessary to slow down the vehicle, the brake pedal may be depressed slightly and by virtue of the slotted link 81 in the brake rod 80, the wheel brakes will not be affected at first. However, since the tension spring 77 has sufficient strength to pull, it will be transmitted to the lever 78 which will, through arm 79, lift the rod 73 and apply the brake shoes 67 against the annular ring 63. As this brake has no lining it cannot lock the drum suddenly, but will slow it down gradually. As the speed of the drum diminishes the idlers 20 will simultaneously begin to rotate allowing for the difference in speed between the shaft 11, drum 15 and drive shaft 12. The power is then transmitted through the gears and the vehicle has been slowed down by gradually increasing the gear ratio so that as the speed is decreased, the power of the motor is relatively increased. This may be used to advantage in going down hill when the car may be slowed down without using the wheel brakes. Another advantage is the fact that the car will gradually go into "low" just before the brakes are applied, thus preventing skidding on wet pavements. Moreover, as the vehicle slows down the motor can stay at the optimum R. P. M., thus developing its greatest power.

"Reverse" is obtained by drawing the knob 47 all the way out. Thus causing the clutch part 57, to engage with the clutch part 37 on the gear 36. The power is now transmitted to the shaft 12 through gears 34, 38, 40, 41, 36 and through the clutch to shaft 12.

From the foregoing it will be evident that this invention remedies many of the defects and disadvantages found in present gear shift mechanisms. It eliminates the necessity of shifting and also reduces to a minimum the number of times the clutch must be used, thus removing one of the difficult operations now required of the driver. It greatly reduces the number of operations required for starting a car, which is important in saving of labor and in avoiding fatigue from the repeated starting and stopping in driving.

As the gears are always in mesh there is no grinding of the gears, nor jerking of the car. The car is always in proper gear ratio for any given load or speed. There is no stalling, no sudden extra load on the engine or the gears, as the transmission is flexible enough to absorb any sudden or uneven change in the load and to adjust itself quickly and automatically to any given speed. There is no "rolling" as the car is always under positive control. Furthermore, this device does not occupy any larger space than the ordinary, standard, gear-shift mechanism. It requires no changes in the other parts of the vehicle, can be adapted to all standard makes of vehicles, and it requires no special skill on the part of the driver.

While the mechanism has been illustrated and described in connection with a motor vehicle, I do not thereby wish to confine it to such use only, but intend to use it in connection with any other device on which it may be used to advantage.

Having described the invention and its objects, what I claim as new and wish to protect by Letters Patent is:

1. In a transmission of the type described having a gear casing, a driving shaft and a driven shaft, a stub shaft interposed between the driving shaft and the driven shaft and free to rotate independently of said shafts, a cylindrical drum rotatingly mounted on the driving shaft and the stub shaft, said drum also supported in bearings formed in the gear casing in a fixed position axially, a gear rigidly mounted on the driving shaft, another gear mounted on the end of the stub shaft, said gears connected by a plurality of idlers so proportioned as to impart different speeds to the stub shaft and the driving shaft, the idlers rotatingly mounted in bearings formed in the drum, a rotary member rigidly secured to the stub shaft and rotating in a chamber formed in the rotating drum, a plurality of centrifugal weights slidingly mounted in said rotary member and adapted to engage with the inner circumference of the chamber to frictionally engage the drum and cause it to rotate with the stub shaft, a brake drum formed in the driving shaft end of the drum, brake shoes mounted in the gear casing for engagement with the inside of said brake drum, and means for actuating said brake shoes connected with the brake pedal of the vehicle on which the transmission is used.

2. In a transmission of the type described having a gear casing, a driving shaft and a driven shaft, a stub shaft interposed between the driving shaft and the driven shaft and free to rotate independently of said shafts, a cylindrical drum rotatingly mounted on the driving shaft and the stub shaft, said drum also supported in bearings formed in the gear casing in a fixed position axially, a gear rigidly mounted on the driving shaft, another gear mounted on the end of the stub shaft, said gears connected by a plurality of idlers so proportioned as to impart different speeds to the stub shaft and the driving shaft, the idlers rotatingly mounted in bearings formed in the drum, a rotary member rigidly secured to the stub shaft and rotating in a chamber formed in the rotating drum, a plurality of centrifugal weights slidingly mounted in said rotary member and adapted to engage with the inner circumference of the chamber to frictionally engage the drum and cause it to rotate with the stub shaft, a brake drum formed in the driving shaft end of the drum, brake shoes mounted in the gear casing for engagement with said brake drum, means for actuating said brake shoes connected with the brake pedal of the vehicle on which the transmission is used, and means associated with said brake pedal which will enable said brake shoes to be set before the wheel brakes of the vehicle are actuated.

3. In a transmission of the type described having a gear casing, a driving shaft and a driven shaft, a stub shaft interposed between the driving shaft and the driven shaft and free to rotate independently of said shafts, a cylindrical drum rotatingly mounted on the driving shaft and the stub shaft, said drum also supported in bearings formed in the gear casing, a gear rigidly mounted on the driving shaft, another gear mounted on the end of the stub shaft, said gears connected by a plurality of idlers so proportioned as to impart different speeds to the stub shaft and the driving shaft, the idlers rotatingly mounted in bearings formed in the drum, a rotary member rigidly secured to the stub shaft and rotating in a chamber formed in the rotating drum, a plurality of centrifugal weights slidingly mounted in said rotary member and adapted to engage with the inner circumference of the chamber to frictionally engage the drum and cause it to rotate with the stub shaft, a brake drum formed in the driving shaft end of the drum, brake shoes mounted in the gear casing for engagement with the inside of said brake drum, means on the periphery of the drum for automatically preventing it from rotating in one direction, and means for actuating said brake shoes connected with the brake pedal of the vehicle on which the transmission is used.

HORACIO E. PEREZ.